United States Patent
Sun et al.

(10) Patent No.: US 11,125,855 B2
(45) Date of Patent: Sep. 21, 2021

(54) METHOD AND SYSTEM USING TR ASSEMBLY TO OBTAIN INTERMEDIATE-FREQUENCY CONTROLLABLE SIGNAL

(71) Applicants: SHENZHEN CCT THZ TECHNOLOGY CO., LTD, Shenzhen (CN); CHINA COMMUNICATION TECHNOLOGY CO., LTD, Shenzhen (CN)

(72) Inventors: Chao Sun, Shenzhen (CN); Juncheng Liu, Shenzhen (CN); Chunchao Qi, Shenzhen (CN); Guangsheng Wu, Shenzhen (CN); Shukai Zhao, Shenzhen (CN); Qing Ding, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 349 days.

(21) Appl. No.: 16/317,459

(22) PCT Filed: Jul. 5, 2017

(86) PCT No.: PCT/CN2017/091869
§ 371 (c)(1),
(2) Date: Jan. 11, 2019

(87) PCT Pub. No.: WO2018/010585
PCT Pub. Date: Jan. 18, 2018

(65) Prior Publication Data
US 2019/0302230 A1     Oct. 3, 2019

(30) Foreign Application Priority Data
Jul. 12, 2016   (CN) .......................... 201610561530.2

(51) Int. Cl.
*G01S 7/32* (2006.01)
*G01S 7/282* (2006.01)
*G01S 7/02* (2006.01)

(52) U.S. Cl.
CPC .................. *G01S 7/32* (2013.01); *G01S 7/02* (2013.01); *G01S 7/282* (2013.01)

(58) Field of Classification Search
CPC ...... G01S 13/88; G01S 13/887; G01S 13/888; G01S 7/02; G01S 7/282; G01S 7/32
See application file for complete search history.

(56) References Cited

U.S. PATENT DOCUMENTS 5,374,903 A * 12/1994 Blanton .................. G01S 7/282
                                                                          331/178
5,428,361 A *  6/1995 Hightower .............. G01S 7/282
                                                                          331/107 A
(Continued)

FOREIGN PATENT DOCUMENTS

CN        201600448       10/2010
CN        202906898        4/2013
(Continued)

*Primary Examiner* — Peter M Bythrow
(74) *Attorney, Agent, or Firm* — Maier & Maier, PLLC

(57) ABSTRACT

A disclosed method includes: dividing a signal into a first signal and a second signal; performing frequency multiplication and amplification on the first signal to obtain an intermediate signal of corresponding power and frequency, and using the second signal as a local oscillation signal. The method further includes dividing the intermediate signal into a first intermediate signal and a second intermediate signal, and using the first intermediate signal as a reference signal; performing frequency mixing on the second intermediate signal and the local oscillation signal to obtain a mixed signal, which is a high-frequency millimeter wave signal; transmitting the mixed signal by a transmitting antenna; and performing frequency mixing on the signal received by a
(Continued)

receiving antenna and the reference signal to obtain an intermediate-frequency controllable signal having a frequency consistent with that of the output signal of the signal source.

10 Claims, 2 Drawing Sheets

(56) References Cited

U.S. PATENT DOCUMENTS

| | | | | |
|---|---|---|---|---|
| 6,606,483 B1* | 8/2003 | Baker | ............ | H03F 1/0277 |
| | | | | 455/126 |
| 6,683,561 B1* | 1/2004 | Tait | ............ | G01S 7/282 |
| | | | | 342/118 |
| 6,828,933 B1* | 12/2004 | Doerry | ............ | G01S 7/282 |
| | | | | 342/194 |
| 7,002,511 B1* | 2/2006 | Ammar | ............ | G01S 7/032 |
| | | | | 342/118 |
| 7,099,636 B2* | 8/2006 | Rozenblit | ............ | H03F 1/0272 |
| | | | | 455/126 |
| 2006/0012512 A1* | 1/2006 | Jirskog | ............ | H01Q 21/065 |
| | | | | 342/124 |
| 2012/0082072 A1* | 4/2012 | Shen | ............ | H04B 1/10 |
| | | | | 370/297 |
| 2012/0108188 A1* | 5/2012 | Matsumoto | ............ | H03F 1/32 |
| | | | | 455/118 |
| 2012/0268315 A1* | 10/2012 | Tirkel | ............ | G01S 13/88 |
| | | | | 342/147 |
| 2016/0327422 A1* | 11/2016 | Gluth | ............ | G01S 7/285 |
| 2019/0302230 A1* | 10/2019 | Sun | ............ | G01S 7/32 |
| 2019/0310299 A1* | 10/2019 | Kang | ............ | G01R 29/0892 |
| 2020/0195197 A1* | 6/2020 | Leabman | ............ | H04B 1/385 |

FOREIGN PATENT DOCUMENTS

| | | |
|---|---|---|
| CN | 204031163 | 12/2014 |
| CN | 205377865 | 7/2016 |
| CN | 106226741 | 12/2016 |
| EP | 1049246 | 11/2000 |

\* cited by examiner

METHOD AND SYSTEM USING TR ASSEMBLY TO OBTAIN INTERMEDIATE-FREQUENCY CONTROLLABLE SIGNAL

PRIORITY

This application is a national stage entry under 35 U.S.C. 371 of PCT Patent Application No. PCT/CN2017/091869, filed Jul. 5, 2017, which claims priority to Chinese Patent Application No. 201610561530.2, filed Jul. 12, 2016, the entire contents of each of which are incorporated herein by reference.

TECHNICAL FIELD

Disclosed embodiments relate to the field of signal frequency conversion, and include a method and system using TR assembly to obtain intermediate-frequency controllable signal.

BACKGROUND

With the rapid development of science and technology, modern high technologies of electronic and information have been widely infiltrated into all aspects of civil system. Millimeter wave's frequency is between 30 GHz to 300 GHz (with the wavelength from 1 mm to 10 mm), which belongs to high frequency band. Millimeter wave technology is an indispensable part in the whole electromagnetic spectrum. Due to the advantages of narrow beam, wide band, confidentiality, strong anti-interference capability, and high capacity, millimeter wave technology is drawing people's attention. It is these unique characteristics that bring millimeter wave technology wide application, especially in the fields of non-destructive inspection and security inspection.

SUMMARY

In view of the above, in order to apply millimeter wave in the fields of non-destructive inspection and security inspection, this disclosure provides a method and system using TR assembly to obtain intermediate-frequency controllable signal.

A method using a TR assembly to obtain an intermediate-frequency controllable signal includes:

dividing an output signal of a signal source into a first signal and a second signal; performing frequency multiplication and amplification on the first signal to obtain an intermediate signal of corresponding power and frequency, and using the second signal as a local oscillation signal; dividing the intermediate signal into a first intermediate signal and a second intermediate signal, wherein the first intermediate signal is identical to the second intermediate signal, and using the first intermediate signal as a reference signal; performing frequency mixing on the second intermediate signal and the local oscillation signal to obtain a mixed signal, which is a millimeter wave signal; transmitting the mixed signal by a transmitting antenna; and performing frequency mixing on the signal received by a receiving antenna and the reference signal to obtain an intermediate-frequency controllable signal having a frequency consistent with that of the output signal of the signal source.

In one embodiment, multistage frequency multiplication and amplification is performed on the first signal to obtain an intermediate signal of corresponding power and frequency; wherein each stage frequency multiplication and amplification includes: performing frequency multiplication on a signal, filtering the frequency-multiplicated signal, adjusting the filtered signal by an attenuator, and amplifying the adjusted signal.

In one embodiment, the mixed signal is amplified, and the amplified signal is adjusted by an adjustable attenuator.

In one embodiment, the signal received by the receiving antenna and reflected by an object is denoised and amplified.

A system using a TR assembly to obtain an intermediate-frequency controllable signal includes: a signal source, a frequency multiplication and amplification module, a first power dividing unit, a second power dividing unit, a first mixing unit, a second mixing unit, a transmitting antenna, and a receiving antenna; the first power dividing unit is configured to divide the signal transmitted by the signal source into a first signal and a second signal, wherein the second signal is used as a local oscillation signal; the frequency multiplication and amplification module is configured to perform frequency multiplication and amplification on the first signal to obtain an intermediate signal of corresponding power and frequency; the second power dividing unit is configured to divide the intermediate signal into a first intermediate signal and a second intermediate signal, wherein the first intermediate signal is identical to the second intermediate signal, and the first intermediate signal is used as a reference signal; the first mixing unit is configured to perform frequency mixing on the second intermediate signal and the local oscillation signal to obtain a mixed signal, which is a millimeter wave signal; the transmitting antenna is configured to transmit the mixed signal; the second mixing unit is configured to perform frequency mixing on the signal received by the receiving antenna and the reference signal to obtain an intermediate-frequency controllable signal having a frequency consistent with that of the output signal of the signal source.

In an embodiment, the frequency multiplication and amplification module includes a plurality of frequency multiplication and amplification units, and each frequency multiplication and amplification unit includes a frequency multiplier, a filter, an attenuator, an amplifier; the signal input in the frequency multiplication and amplification unit is processed by the frequency multiplier, the filter, the attenuator, and the amplifier sequentially to obtain a frequency multiplicated and amplified signal.

In an embodiment, the system using a TR assembly to obtain an intermediate-frequency controllable signal also includes an amplification module, and the amplification module includes an amplifier and an adjustable attenuator, the mixed signal is processed by the amplifier and the adjustable attenuator sequentially to obtain a mixed signal with a preset power.

In an embodiment, the system using a TR assembly to obtain an intermediate-frequency controllable signal also includes a low noise amplifier, and the signal received by the receiving antenna is sent to the second mixing unit after being processed by the low noise amplifier.

In an embodiment, the system using a TR assembly to obtain an intermediate-frequency controllable also includes a frequency source; and the first signal is sent to the frequency multiplication and amplification module after being processed by the frequency source.

In an embodiment, the second power dividing unit is a three-port coupler; the signal output port of the frequency multiplication and amplification module is connected to the signal input port of the coupler, the two signal output ports of the coupler are connected to a signal input port of the first mixing unit and a signal input port of the second mixing unit respectively.

The beneficial technical effects of the above technical solutions include: the output signal of the signal source is divided into two signals, wherein one signal is the local oscillation signal, and another signal is processed by a frequency multiplication link to increase the signal's power and frequency. Because a single frequency multiplication link is used, the cost is lowered. The signal received by the receiving antenna is mixed with the reference signal to obtain an intermediate-frequency controllable signal having a frequency consistent with that of the signal source, which is convenient to implement and easy to adjust.

DETAILED DESCRIPTION

In order to further explain the technical measures and the technical effect of this disclosure, the technical solution of this disclosure is described below clearly and completely in combination with accompanying drawings and disclosure of embodiments.

Figure 1:
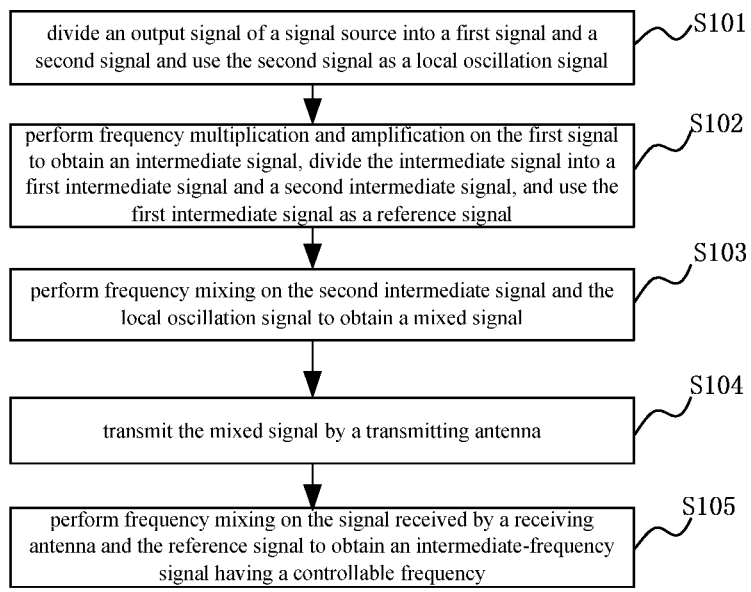
FIG. 1 illustrates a schematic flow chart of a method using TR assembly to obtain intermediate-frequency controllable signal according to an embodiment.

FIG. 1 illustrates a schematic flow chart of a method using TR assembly to obtain intermediate-frequency controllable signal according to an embodiment.

As illustrated in FIG. 1, the method using TR assembly to obtain intermediate-frequency controllable signal in this embodiment includes the following stages:

S101, dividing an output signal of a signal source into a first signal and a second signal, and using the second signal as a local oscillation signal.

It should be noted that, the output signal of the signal source is a low-frequency signal, and the operating frequency is, e.g., 100 MHz. The divided first signal is identical to the second signal.

S102, performing frequency multiplication and amplification on the first signal to obtain an intermediate signal of corresponding power and frequency, dividing the intermediate signal into a first intermediate signal and a second intermediate signal, and using the first intermediate signal as a reference signal.

Preferably, the stage of performing frequency multiplication and amplification on the first signal to obtain an intermediate signal of corresponding power and frequency includes: performing multistage frequency multiplication and amplification on the first signal to obtain an intermediate signal of corresponding power and frequency; wherein each stage frequency multiplication and amplification includes: performing frequency multiplication on a signal, filtering the frequency-multiplicated signal, adjusting the filtered signal by an attenuator, and amplifying the adjusted signal.

S103, performing frequency mixing on the second intermediate signal and the local oscillation signal to obtain a mixed signal, which is a millimeter wave signal.

Millimeter wave's frequency is between 30 GHz to 300 GHz (with the wavelength from 1 mm to 10 mm). In practical engineering applications, the low end frequency of millimeter wave is usually lowered to 26 GHz. In the electromagnetic spectrum, the frequency of millimeter wave is between infrared wave and microwave. Compared with infrared wave, millimeter wave can work in all-weather condition and can be applied in severe environment, such as smoke and mist. Under circumstance of more and more crowed microwave frequency band, millimeter wave has the advantages of microwave, and also has some advantages that low-frequency band microwaves do not have. Compared with microwave, millimeter wave has short wavelength, wide frequency band (having enormous usage room), and the propagation feature in the air is a typical characteristic of millimeter wave. Specifically, millimeter wave has the following characteristics: 1. high precision, millimeter wave radar is more easily to obtain narrow wave beam and large absolute bandwidth, and millimeter wave radar system has strong anti-electronic interference capability. 2. In a Doppler radar, millimeter wave has high Doppler frequency resolution. 3. In a millimeter wave imaging system, millimeter wave is sensitive to an object's shape and structure and has a good ability to distinguish a metal object and background environment, and the obtained image has high resolution, so as to improve the ability of identifying and detecting an object. 4. Millimeter wave can penetrate plasma. 5. Compared with infrared wave, millimeter wave is less influenced by severe natural environment. 6. Millimeter wave system is small in volume and light in weight, and compared with microwave circuit, the size of millimeter wave system is much smaller. Therefore, millimeter wave system is more easily to be integrated. It is these unique characteristics that bring millimeter wave technology wide application, especially in the fields of non-destructive inspection and security inspection.

S104, transmitting the mixed signal by a transmitting antenna;

Preferably, before the stage of transmitting the mixed signal by a transmitting antenna, it also includes: amplifying the mixed signal, adjusting the amplified signal by an adjustable attenuator, and sending the adjusted signal to the transmitting antenna by a circulator.

S105, performing frequency mixing on the signal received by a receiving antenna and the reference signal to obtain an intermediate-frequency controllable signal having a frequency consistent with that of the signal source.

Preferably, in a security inspection system, the signal transmitted by a transmitting antenna is used to detect an object, and the receiving antenna receives the signal reflected by the object. In order to improve the signal quality, it is also possible to denoise and amplify the signal received by the receiving antenna before mixing the signal with the reference signal.

According to the above embodiment, the output signal of the signal source is divided into two signals, wherein one signal is the local oscillation signal, and another signal is processed by a frequency multiplication link to increase the signal's power and frequency, so as to lower the cost. The signal received by the receiving antenna is mixed with the reference signal to obtain an intermediate-frequency controllable signal having a frequency consistent with that of the signal source, which is convenient to implement and easy to adjust. The stage number of the frequency multiplication link is determined by output frequency of the signal source and required final output frequency, so as to lower the cost.

It should be noted that, regarding the aforementioned method embodiment, in order to describe briefly, it is expressed as a series of actions. However, persons skilled in the art should understand that, this disclosure is not limited by the sequence of the described actions, since based on this disclosure, some stages can be implemented according to other sequences or implemented simultaneously.

According to the spirit same as that of the method using TR assembly to obtain intermediate-frequency controllable signal in the above embodiment, this disclosure can also provide a system using TR assembly to obtain intermediate-frequency controllable signal, which is used to execute the method using TR assembly to obtain intermediate-frequency controllable signal. For illustration purposes, in the schematic structure diagram of a system using TR assembly to obtain intermediate-frequency controllable signal only shows parts related to the embodiment of this disclosure. Persons skilled in the art should understand that, the illustrative structure is not construed as a limit to the system but may include more parts or less parts than illustrated, or a combination of some assemblies, or different assembly arrangements.

Figure 2:
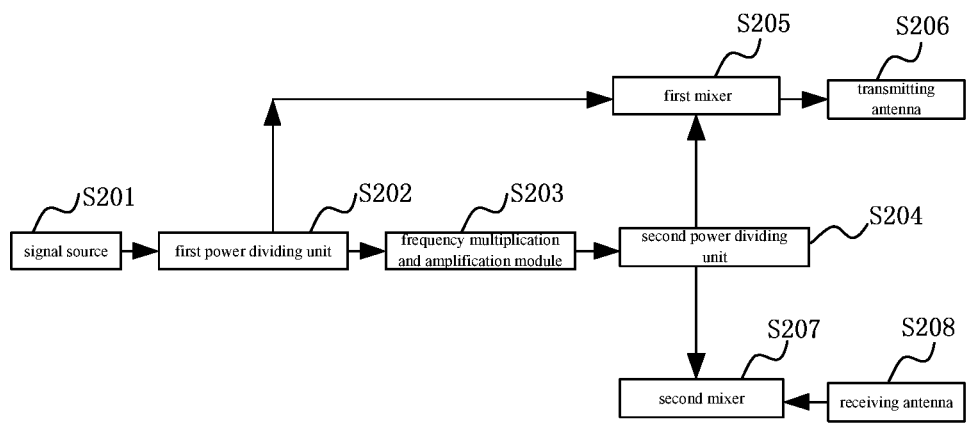
FIG. 2 illustrates a schematic structure diagram of a system using TR assembly to obtain intermediate-frequency controllable signal according to an embodiment.

FIG. 2 illustrates a schematic structure diagram of a system using TR assembly to obtain intermediate-frequency controllable signal according to an embodiment. As illustrated in FIG. 2, the system using TR assembly to obtain intermediate-frequency controllable signal includes: a signal source S201, a first power dividing unit S202, a frequency multiplication and amplification module S203, a second power dividing unit S204, a first mixer S205, a transmitting antenna S206, a second mixer S207, and a receiving antenna S208, and descriptions of the above components are as follows.

Preferably, the signal source S201 can be a crystal oscillator with operating frequency of 100 MHz.

The first power dividing unit S202 is used to divide the signal transmitted by the signal source S201 into a first signal and a second signal, and the second signal is used as a local oscillation signal.

The frequency multiplication and amplification module S203 is used to perform frequency multiplication and amplification on the first signal to obtain an intermediate signal of corresponding power and frequency, wherein the corresponding power and frequency are set according to the actual application.

The second power dividing unit S204 is used to divide the intermediate signal into a first intermediate signal and a second intermediate signal, wherein the first intermediate signal is identical to the second intermediate signal, and the first intermediate signal is used as a reference signal.

The first mixer S205 is used to perform frequency mixing on the second intermediate signal and the local oscillation signal to obtain a mixed signal, which is a millimeter wave signal.

The transmitting antenna S206 is used to transmit the mixed signal to detect the object.

The second mixer S207 is used to perform frequency mixing on the signal received by the receiving antenna S208 and the reference signal to obtain an intermediate-frequency controllable signal having a frequency consistent with that of the signal source.

According to the above embodiment, the output signal of the signal source is divided into two signals, wherein one signal is the local oscillation signal, and another signal is processed by a single frequency multiplication link to increase the signal's power and frequency, so as to lower the cost. The signal received by the receiving antenna is mixed with the reference signal to obtain an intermediate-frequency controllable signal having a frequency consistent with that of the signal source, which is convenient to implement and easy to adjust.

Figure 3:
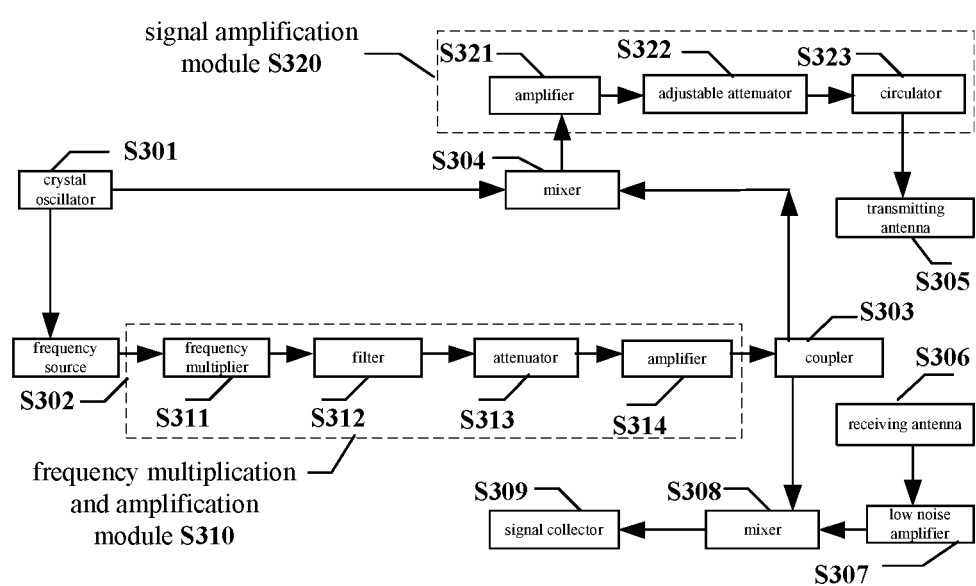
FIG. 3 illustrates a schematic structure diagram of a system using TR assembly to obtain intermediate-frequency controllable signal according to another embodiment.

FIG. 3 illustrates a schematic structure diagram of a system using TR assembly to obtain intermediate-frequency controllable signal according to another embodiment. As illustrated in FIG. 3, the system using TR assembly to obtain intermediate-frequency controllable signal includes: a crystal oscillator S301, a frequency source S302, a frequency multiplication and amplification module S310, a coupler S303, a mixer S304 (a first mixing unit), a signal amplification module S320, a low noise amplifier S307, a transmitting antenna S305, a receiving antenna S306, a mixer S308 (a second mixing unit), and a signal collector S309. Each module is described as follow.

The crystal oscillator S301 is a signal source, used to output signals. Preferably, the operating frequency of the crystal oscillator S301 is 100 MHz. A first signal output by the crystal oscillator S301 is processed by the frequency source S302 to obtain a signal with stable phase and good phase noise, which is sent to the frequency multiplication and amplification module S310. A second signal output by the crystal oscillator S301 is sent to the mixer S304 as a local oscillation signal.

The frequency multiplication and amplification module S310 includes a frequency multiplication and amplification unit, which includes a frequency multiplier S311, a filter S312, an attenuator S313, and an amplifier S314. The first signal is processed by the frequency multiplier S311, the filter S312, the attenuator S313, and the amplifier S314 sequentially to obtain an intermediate signal.

The frequency multiplier S311 is used to amplify an input signal. The filter S312 is used to suppress harmonic wave and fundamental wave generated by frequency multiplication. The attenuator S313 is used to lower the power entering the amplifier S314 to ensure amplifier S314 to work in linearity range. The frequency multiplication and amplification module S310 plays a critical role in the whole process. The first signal can be processed by the frequency multiplication and amplification module S310 to obtain an intermediate signal of corresponding power and frequency. The stage number of the frequency multiplication and amplification module S310 is determined by the output frequency of the crystal oscillator S301 and the required final output frequency.

The coupler S303 is a three-port device, and the signal output port of the frequency multiplication and amplification module S310 is connected to the signal input port of the coupler S303. The two signal output ports of the coupler S303 are connected to a signal input port of the mixer S304 and a signal input port of the mixer S308 respectively. Preferably, the coupler S303 is a 3 dB coupler.

The mixer S304 is used to perform frequency mixing on a second intermediate signal and the local oscillation signal output by the crystal oscillator S301 to obtain a mixed signal, which is a millimeter wave signal.

The signal amplification module S320 includes an amplifier S321, an adjustable attenuator S322, and a circulator S323. The mixed signal is processed by the amplifier S321, the adjustable attenuator S322, and the circulator S323 sequentially, wherein the mixed signal is processed by the amplifier S321 and the adjustable attenuator S322 to obtain a mixed signal with a preset power, and the circulator S323 guarantees the mixed signal's unidirectional flow.

The transmitting antenna S305 is used to transmit the mixed signal with a preset power to detect an object.

The low noise amplifier S307 is used to perform noise reduction and signal amplification on the signal received by the receiving antenna S306.

The mixer S308 is used to perform frequency mixing on the signal processed by the low noise amplifier S307 and the reference signal to obtain an intermediate-frequency controllable signal having a frequency consistent with that of the crystal oscillator S301.

The signal collector S309 is used to collect the signal mixed by the mixer S308, i.e., the intermediate-frequency controllable signal having a frequency consistent with that of the crystal oscillator S301.

Based on the above system using TR assembly to obtain intermediate-frequency controllable signal, the specific work flow is that: in the transmitting link, the signal of 100 MHz transmitted by the crystal oscillator is divided into two signals: a first signal is processed by a frequency synthesizer to obtain a stable radio-frequency signal, and after multistage frequency multiplication and amplification, the required power and frequency are obtained. Then, the signal is divided into two signals, which are respectively used as a reference signal and an intermediate signal. The intermediate signal, after being transmitted, is upconverted by another signal output by the crystal oscillator in a mixer, and then is transmitted by a transmitting antenna after amplifying. In the receiving link, the reflected signal, after being received by a receiving antenna, is amplified and filtered, and then is mixed with the reference signal to obtain the output intermediate-frequency signal finally. Ideally, the frequency of the obtained intermediate-frequency signal is the same as that of the crystal oscillator, so as to realize the intermediate-frequency signal's controllable function.

One signal output by the crystal oscillator is used as a local oscillation signal, and another signal is processed by a single frequency multiplication link to increase signal's power and frequency, so as to lower the cost. The signal received by the receiving antenna is mixed with the reference signal to obtain an intermediate-frequency controllable signal having a frequency consistent with that of the signal source, which is convenient to implement and easy to adjust. The stage number of the frequency multiplication link is determined by output frequency of the signal source and required final output frequency, so as to lower the cost.

The above embodiments have the following advantages:

(1) One signal output by the crystal oscillator is used as a local oscillation signal, and another signal is processed by a single frequency multiplication link to increase signal's power and frequency, so as to lower the cost.

(2) The stage number of the frequency multiplication link is determined by output frequency of the crystal oscillator and required final output frequency, which is easy to implement.

(3) The signal received by the receiving antenna is mixed with the reference signal to obtain an intermediate-frequency controllable signal having a frequency consistent with that of the crystal oscillator, which is convenient to implement and easy to adjust.

The technical features of the above described embodiments can be combined arbitrarily, and for simplicity, not all possible combinations of technical features of the above embodiments are described. However, all the combinations of these technical features, as long as they are not conflictive, should be regarded as being within the scope of this disclosure.

The above embodiments merely express several implementation ways of this disclosure. The description is specific and in detail, but it should not be construed as a limit to this disclosure. It should be noted that, without departing from the spirit of this disclosure, persons skilled in the art can make various modifications or alternatives, which all belong to the scope of this disclosure. Therefore, the technical scope of this disclosure must be determined according to the scope of the accompanying claims.

What is claimed is:

1. A method of using a transmitter-receiver (TR) assembly to generate an intermediate-frequency controllable signal, the method comprising:
    dividing an output signal generated by a signal source device to generate a first signal and a second signal;
    performing frequency multiplication and amplification on the first signal to generate an intermediate signal having corresponding power and frequency, and using the second signal as a local oscillation signal;
    dividing the intermediate signal to generate a first intermediate signal and a second intermediate signal, wherein the first intermediate signal has identical frequency and power characteristics as the second intermediate signal, and using the first intermediate signal as a reference signal;
    performing frequency mixing on the second intermediate signal and the local oscillation signal to generate a mixed signal, which is a millimeter wave signal;
    controlling a transmitting antenna of the TR assembly to transmit the mixed signal;
    receiving a signal by a receiving antenna of the TR assembly; and
    performing frequency mixing on the signal, received by the receiving antenna, and the reference signal to generate the intermediate-frequency controllable signal having a frequency identical to that of the output signal of the signal source device.

2. The method of claim 1, wherein performing frequency multiplication and amplification on the first signal to generate the intermediate signal comprises:
    performing multistage frequency multiplication and amplification on the first signal to generate the intermediate signal,
    wherein each stage of the multistage frequency multiplication and amplification comprises:
    performing frequency multiplication on a signal to generate a frequency-multiplied signal;
    filtering the frequency-multiplied signal to generate a filtered signal;
    attenuating the filtered signal by using an attenuator to generate an adjusted signal; and
    amplifying the adjusted signal.

3. The method of claim 1, further comprising:
    amplifying the mixed signal to generate an amplified mixed signal;
    adjusting the amplified mixed signal by using an adjustable attenuator to generate an adjusted mixed signal; and
    controlling the transmitting antenna to transmit the adjusted mixed signal.

4. The method of claim 1, further comprising:
    denoising and amplifying the signal received by the receiving antenna to generate an adjusted received signal; and
    performing frequency mixing on the adjusted received signal and the reference signal to generate the intermediate-frequency controllable signal.

5. A system including a TR assembly that is configured to generate an intermediate-frequency controllable signal, the system comprising:

a signal source device that is configured to generate and transmit a signal;
a frequency multiplication and amplification circuit;
a first power dividing circuit;
a second power dividing circuit;
a first mixing circuit;
a second mixing circuit;
a transmitting antenna; and;
a receiving antenna,
wherein the first power dividing circuit is configured to divide a signal transmitted by the signal source device to generate a first signal and a second signal, wherein the second signal is used as a local oscillation signal,
wherein the frequency multiplication and amplification circuit is configured to perform frequency multiplication and amplification on the first signal to generate an intermediate signal having corresponding power and frequency,
wherein the second power dividing circuit is configured to divide the intermediate signal to generate a first intermediate signal and a second intermediate signal, wherein the first intermediate signal has identical frequency and power characteristics as the second intermediate signal, and the first intermediate signal is used as a reference signal,
wherein the first mixing circuit is configured to perform frequency mixing on the second intermediate signal and the local oscillation signal to generate a mixed signal, which is a millimeter wave signal,
wherein the transmitting antenna is configured to transmit the mixed signal, and
wherein the second mixing circuit is configured to perform frequency mixing on a signal received by the receiving antenna and the reference signal to generate an intermediate-frequency controllable signal having a frequency identical to that of the output signal of the signal source device.

6. The system of claim 5, wherein the frequency multiplication and amplification circuit comprises a plurality of cascaded frequency multiplication and amplification circuits,
wherein each frequency multiplication and amplification circuit comprises:
a frequency multiplier circuit;
a filter circuit;
an attenuator circuit; and
an amplifier circuit,
wherein the frequency multiplication and amplification circuit is configured to process an input signal sequentially using the frequency multiplier circuit, the filter circuit, the attenuator circuit, and the amplifier circuit to generate a frequency multiplicated and amplified signal.

7. The system of claim 5, further comprising an amplification circuit, the amplification circuit including an amplifier and an adjustable attenuator,
wherein the mixed signal is processed by the amplifier and the adjustable attenuator sequentially to generate a mixed signal with a preset power.

8. The system of claim 5, further comprising a low noise amplifier,
wherein the low noise amplifier is configured:
to process the signal received by the receiving antenna to generate a processed signal, and
to send the processed signal to the second mixing circuit.

9. The system of claim 5, further comprising a frequency source;
wherein the frequency source is configured:
to process the first signal to generate a processed signal having stable phase and controlled phase noise, and
to provide the processed signal to the frequency multiplication and amplification circuit.

10. The system of claim 5, wherein the second power dividing circuit is a three-port coupler,
wherein a signal output port of the frequency multiplication and amplification circuit is connected to a signal input port of the three-port coupler, and
wherein two signal output ports of the three-port coupler are connected to a signal input port of the first mixing circuit and to a signal input port of the second mixing circuit, respectively.

* * * * *